Dec. 3, 1940.    W. SCHNITTGER    2,224,064
THEODOLITE
Filed July 13, 1939    6 Sheets-Sheet 1

Inventor:
Wilhelm Schnittger
By A. D. Adams
Attorney

Dec. 3, 1940.  W. SCHNITTGER  2,224,064
THEODOLITE
Filed July 13, 1939  6 Sheets-Sheet 2

Inventor:
Wilhelm Schnittger
By A. D. Adams
Attorney

Dec. 3, 1940.                W. SCHNITTGER                2,224,064
                                THEODOLITE
                         Filed July 13, 1939         6 Sheets-Sheet 3

Inventor:
Wilhelm Schnittger
By A.D. Adams
Attorney

Dec. 3, 1940.  W. SCHNITTGER  2,224,064
THEODOLITE
Filed July 13, 1939  6 Sheets-Sheet 4

Inventor:
Wilhelm Schnittger
By A.D.Adams
Attorney

Dec. 3, 1940.  W. SCHNITTGER  2,224,064
THEODOLITE
Filed July 13, 1939   6 Sheets-Sheet 5

Inventor:
Wilhelm Schnittger
By A.D. Adams
Attorney

Dec. 3, 1940.   W. SCHNITTGER   2,224,064
THEODOLITE
Filed July 13, 1939   6 Sheets-Sheet 6

Inventor:
Wilhelm Schnittger
By A. D. Adams
Attorney

Patented Dec. 3, 1940

2,224,064

UNITED STATES PATENT OFFICE 2,224,064

THEODOLITE

Wilhelm Schnittger, Berlin-Wilmersdorf, Germany, assignor to Askania-Werke A. G., a corporation of Germany Application July 13, 1939, Serial No. 284,336
In Germany February 18, 1933

9 Claims. (Cl. 88—2.7)

This application is a continuation-in-part of the application Ser. No. 106,419.

This invention relates to theodolites, more particularly to instruments of the type being fixed in azimuth having a horizontal major axis and a minor axis which is disposed at right angles to said major axis.

An object of this invention is to provide an instrument having a simple construction and offering an unobstructed, wide field of view for one or two observers.

Another object of this invention is to provide an instrument permitting two observers simultaneously to observe the same field of view without impeding each other.

Further aims, objects, and advantages of this invention will appear from a consideration of the description which follows with the accompanying drawings, showing embodiments of this invention for illustrative purposes. It is to be understood, however, that the description is not to be taken in a limiting sense, the scope of this invention being defined in the appended claims.

Referring to the drawings.

Figure 1:
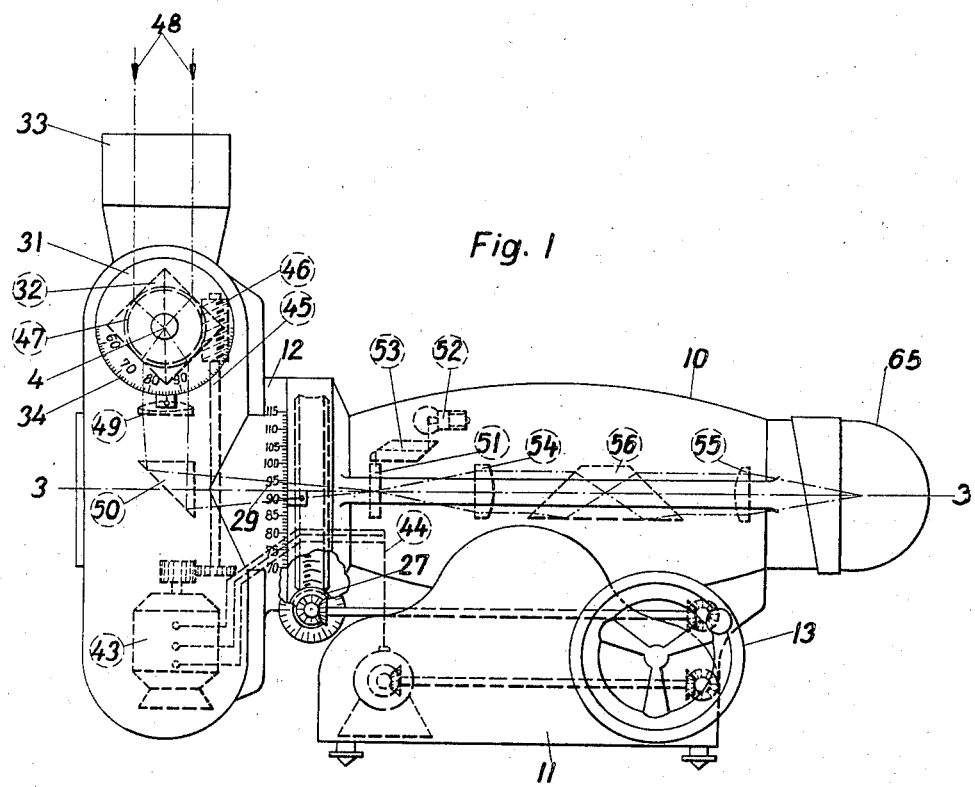
Fig. 1 is a side elevation of a theodolite embodying the invention.
Figure 2:
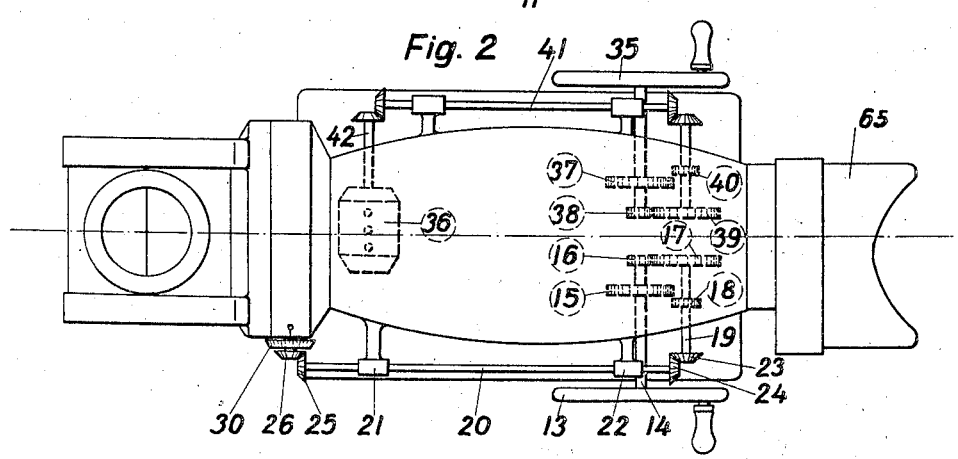
Fig. 2 is a plan view of the instrument, shown in Fig. 1.
Figure 3:
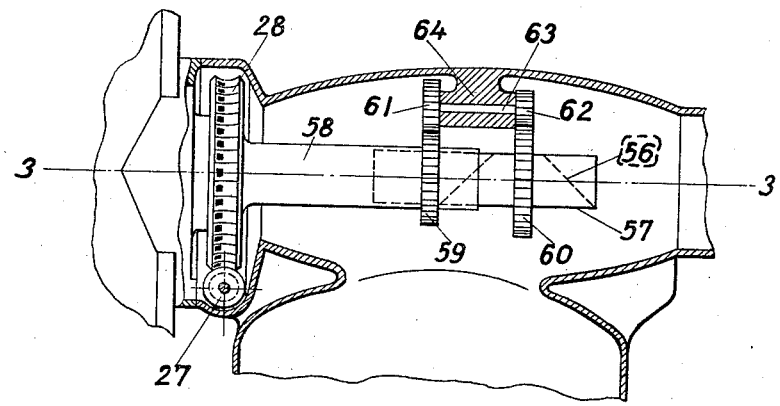
Fig. 3 shows in detail a gear for adjusting an erecting prism of the theodolite, shown in Figs. 1 and 2.

In the embodiment, shown in Figs. 1 to 3, an instrument body 10 is mounted on a socket 11. The body supports a casing 12 for tilting movement about a horizontal major axis 3—3 relatively to the body. The tilting movement of the casing 12 is controlled by manual means, a hand wheel 13 and a gearing being shown for this purpose. The shaft 14 of the hand wheel is mounted for rotation and axial displacement in a socket 11 to enable gears 15 and 16 to be brought into engagement with gears 17 and 18 of a second shaft 19. In the inward position, shown in the drawings, the gears are in such engagement as to move the shaft 19 relatively slowly. A further shaft 20 mounted in bearings 21 and 22 is connected to the shaft 19 by means of the bevel gears 23 and 24 and drives a worm 27 meshing with a large worm wheel 28 for tilting the casing 12. The tilt of the casing may be read on a coarse graduation 29 and a fine graduation 30, the latter being arranged on a disk revolving with the worm 27.

In the casing 12 a support 31 is mounted for tilting movement about a minor axis 4 spaced from the major axis 3—3 in a vertical direction and disposed at right angles to said major axis. The support 31 carries a double reversing prism 32 forming a part of an optical system of the instrument later to be described. A blinder-tube 33 may be provided for the prism. The inclination of the support 31 may be read on a scale 34.

For controlling the inclination of the prism or support a second hand wheel 35 is provided connected therewith by means of suitable motion transmitting devices. In the illustrative example repeater motors are shown for this purpose. A first motor 36 is operated from the hand wheel 35 over a variable transmission gear 37, 38, 39, 40 and shafts 41 and 42. The second repeater motor 43 in the casing 12 is connected to the first motor by means of conductors 44. The second repeater motor 43 drives a shaft 45 carrying a worm 46 which meshes with the worm wheel 47.

Rays of light entering the instrument in the direction of the arrows 48 pass through the double reversing prism 32 and lenses 49 to be deflected into the direction of the major axis 3—3 by means of a reflecting surface, a prism 50 being shown for this purpose. From the prism 50 the light passes through a reticle 51 which is shown as being illuminated by means of an electrical bulb 52 transmitting its light through a prism 53. In the path of parallel light rays between further lenses 54, 55 an erecting prism 56 is arranged. At the ocular end of the instrument an eye-piece 65 may be provided for the observer.

As shown in Fig. 3 the erecting prism 56 is arranged to be rotatable about half the tilting angle of the casing 12 relatively to the body 10. In the illustrated example a supporting tube 57 for the erecting prism is rotatably mounted in a second tube 58 rigidly connected to the large worm gear 28. Gears 59 and 60 are provided on the tubes 58, 57, respectively. Further gears 61 and 62 secured to a shaft 63 are rotatable in a bearing 64 and mesh with gears 59 and 60. The gear ratio is such as to move the supporting tube 57 through half the angle of a worm gear 28.

The theodolite, shown in Figs. 1 to 3 is operable by a single person. When it is of particular importance that two observers simultaneously follow the movements of an object, one of them may control the adjustment of the instrument about the major axis while the other controls the movements about the minor axis. In Figs. 4 to 9 instruments are shown which may be operated by two persons.

Figure 4:
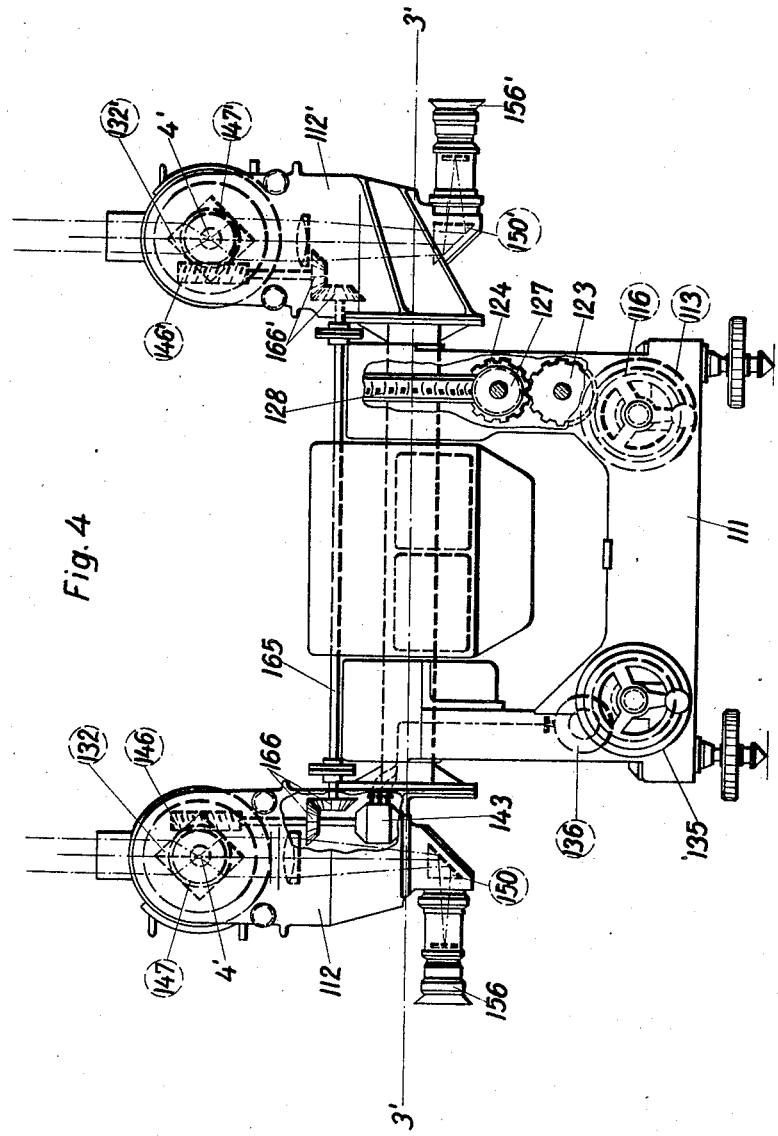
Fig. 4 is a front elevation of another embodiment of this invention.

In the embodiment, shown in Fig. 4, casings 112, 112' are mounted for tilting movement about a horizontal major axis 3'—3'. The tilting movement of the casing is controlled by a hand wheel 113 driving a worm 127 and a worm wheel 128 by means of suitable motion transmitting gears 115, 116, 117, 118, 123, and 124. Supports are provided in the casings which are tiltable relatively thereto about a minor axis 4'. The supports contain double reversing prisms 132 and 132' which are connected for equi-angular movement by means of worms 146 and 146', worm wheels 147, 147' and a shaft 165, connected to the worm shaft by means of spur gears 166, 166'. Repeater motors 136 and 142 are operated by means of a hand wheel 135 and gears 138 and 139.

Eye-pieces 156, 156' are provided for each operator. The rays of light pass in the hereinbefore described manner through the double reversing prism 132, 132' to the oculars after being deflected by means of prisms 150, 150'.

Figure 5:
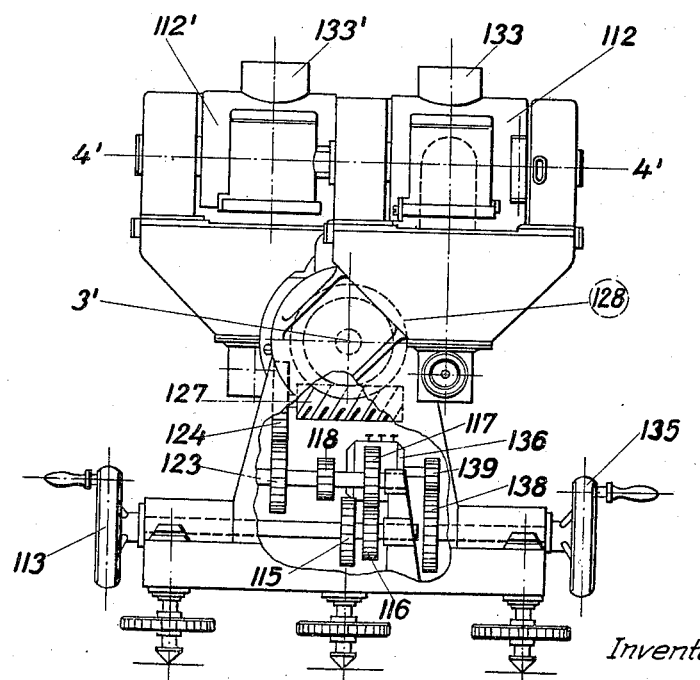
Fig. 5 is a side elevation of the instrument, shown in Fig. 4.

As may be seen from Fig. 5 the view openings 133, 133' are offset in a lateral direction to permit great inclination of the view openings in such a way that neither casing 112, 112' obstructs the view of the other.

Figure 7:
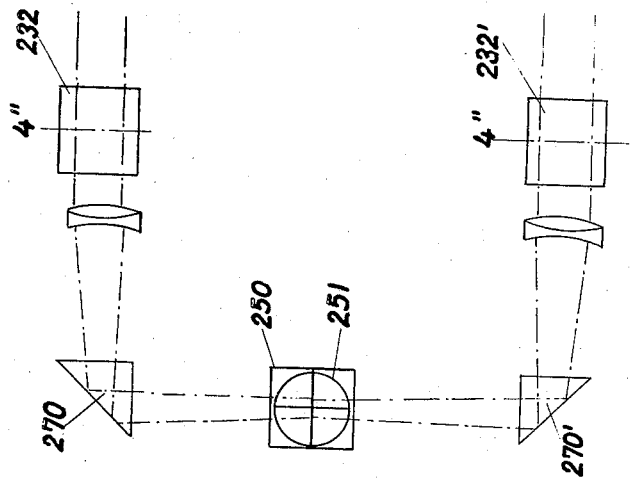
Fig. 7 is an elevation of the system, shown in Fig. 6, a section being taken on line 2—2.
Figure 6:
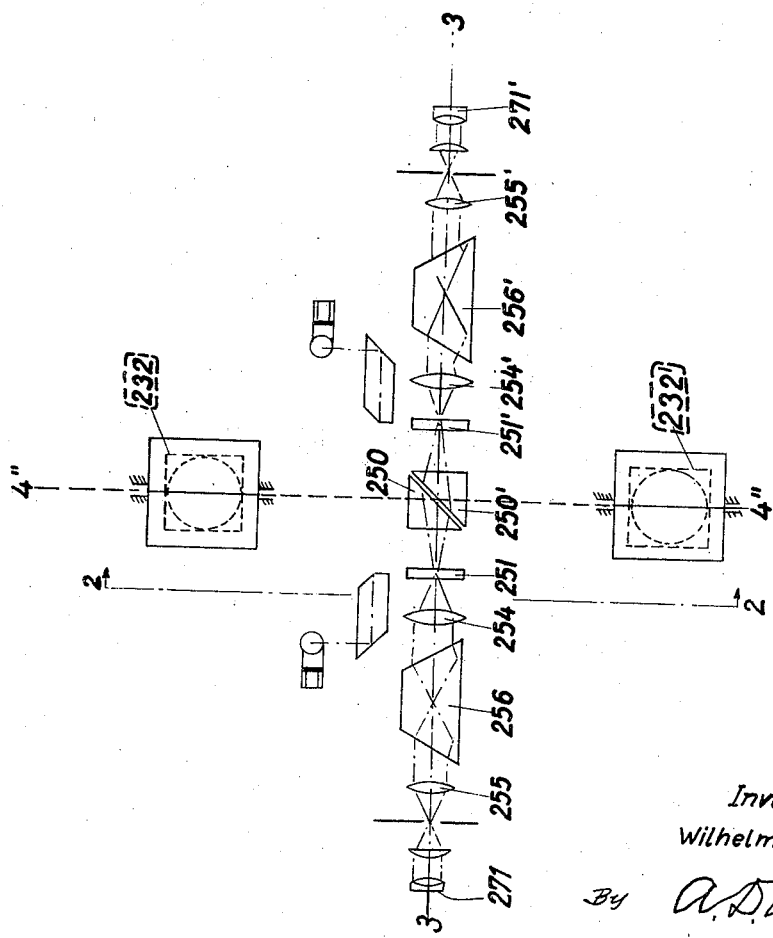
Fig. 6 shows diagrammatically a plan view of an optical system of the theodolite.
Figures 8, 9:
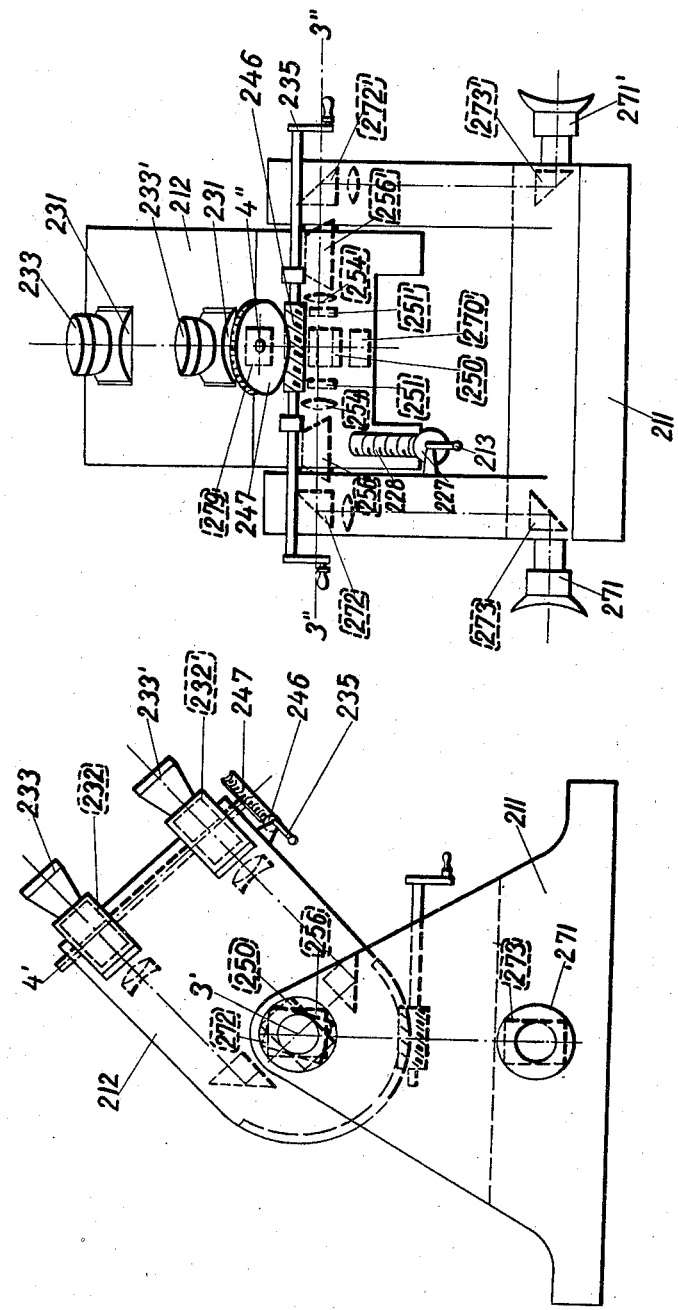
Fig. 8 is a side elevation of an instrument having an optical system according to Figs. 6 and 7.
Fig. 9 is the front elevation of the instrument, shown in Fig. 8.

A further embodiment of the invention is shown in Figs. 8 and 9, the optical system being illustrated in Figs. 6 and 7.

Referring first to Figs. 8 and 9 a socket 211 supports a casing 212 for tilting movement about a major axis 3"—3". The tilting movement is controlled by means of a crank 213, a worm 227 and a worm wheel 228. Tiltably arranged in the casing 212 are supports 231, 231'. The movements about the minor axes are controlled by means of a crank 235, a worm 246, and a worm wheel 247. Eye-pieces 271, 271' are arranged for each operator.

Rays of light enter the view openings 233, 233', pass through double reversing prisms 232, 232' to be deflected towards the major axis by means of prisms 270, 270'. Further prisms 250, 250' deflect the light in the direction of the major axis 3"—3". In the latter path lenses are again provided at 254, 255 on 254', 255', respectively. Between these lenses are arranged erecting prisms 256, 256', respectively. The object may be viewed through oculars 271, 271'.

The axis of observation in which the eye-piece 256 lie may be arranged below, the major axis 3"—3" and further reflecting prisms 272, 273 and 272', 273' be provided for this purpose. The reticles are shown at 251, 251', respectively.

An advantage offered by this invention is that the eye-pieces remain stationary, or substantially stationary in the embodiment of Fig. 4. Furthermore, double reversing prisms of small cross-sectional area may be used. By virtue of the arrangement of the reticle between the veiw opening and the recting prism errors will not be introduced by an excentric rotation of the prism which would affect the accuracy of the observation if a displacement of the major axis were introduced through an eccentric movement of the recting prism relatively to the reticle.

Figure 10:
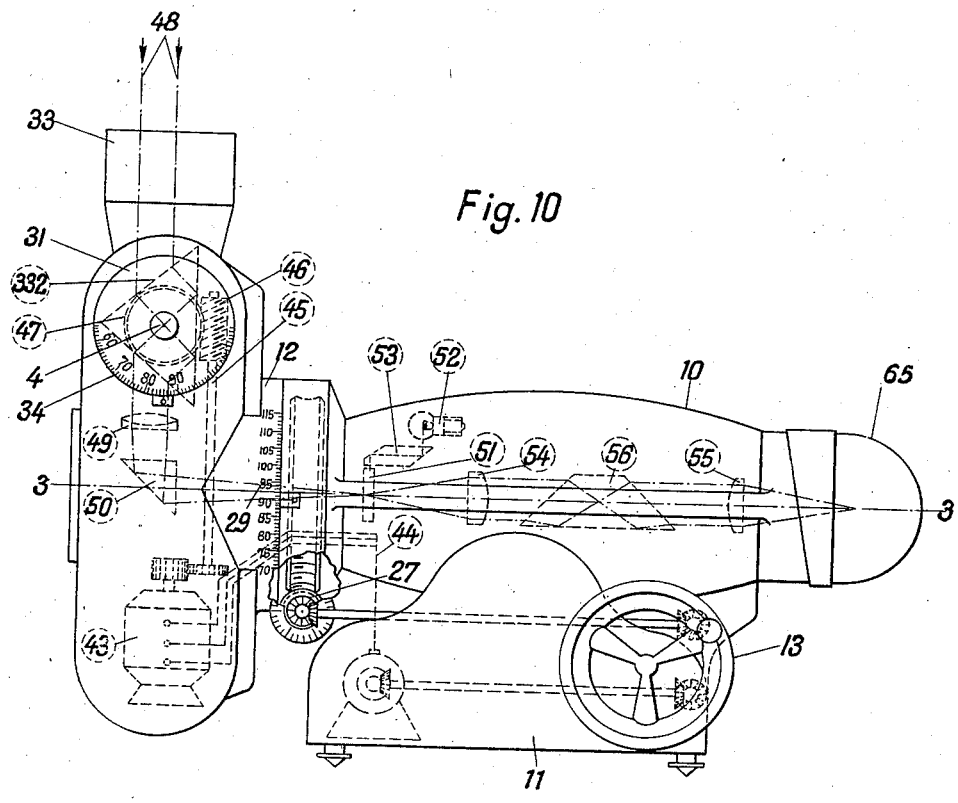
Fig. 10 is a side elevation of another embodiment of this invention.

To realize the inventive idea reflecting means of any convenient type may be used in front of the view opening of the telescope provided that they are mounted for rotation about an axis which is perpendicular both to the axis of the view opening and to the axis of rotation of the support carrying the telescope. For the purpose of the invention for instance a totally reflecting prism may be used rotatably mounted as beforementioned. Fig. 10 shows such an arrangement. The structure shown is the same as illustrated in Fig. 1 except that the totally reflecting prism 332 is substituted for the double reversing prism 32 as shown in Fig. 1. The prism is mounted for tilting movement about the axis 4—4 spaced from the horizontal axis 3—3 in a vertical direction and disposed at right angles to said axis.

Furthermore, any other optical means may be used in front of the view opening without departing from the invention as it is defined in the accompanying claims.

What is claimed is:

1. A theodolite comprising, in combination, a base; a support rotatably mounted on said base about a single horizontal axis; a telescope carried by said support with its view opening perpendicular to the axis of rotation of said support; said telescope having an ocular with its axis parallel to and near the axis of rotation of said support; reflecting means in front of said view opening and mounted for rotation about an axis which is perpendicular both to the axis of said view opening and to the axis of rotation of said support and at a distance from said latter axis in order to enable the turning of the sighting line of the telescope from the vertical to the horizontal in both directions; a light reflector carried by the support for directing light rays to the ocular; means for tilting said telescope about its axis of rotation; means for tilting said reflecting means about its axis of rotation; and means for determining the angle of tilt about said two axes.

2. A theodolite as set forth in claim 1, in which the axis of the ocular of the telescope is coaxially arranged with respect to the axis of rotation of said support.

3. A theodolite comprising, in combination, a base; a support rotatably mounted on said base about a single horizontal axis; a telescope carried by said support with its view opening perpendicular to the axis of rotation of said support; said telescope having an ocular with its axis parallel to the axis of rotation of said support; reflecting means in front of said view opening and mounted for rotation about an axis which is perpendicular both to the axis of said view opening and to the axis of rotation of said support and at a distance from said latter axis in order to enable the turning of the sighting line of the telescope from the vertical to the horizontal in both directions; a light deflector carried by the support for directing light rays to the ocular; means for determining the angle of tilt about said two axes of rotation; two handles mounted on the base on opposite sides of the ocular; a gear operable by the one handle and connected to said support for the telescope for tilting the telescope; and a system for the transmission of angular movements including two repeater motors connected together, one being mounted on the base and operable by the other handle and the other being mounted on said telescope and connected to tilt said reflecting means.

4. A theodolite comprising, in combination, a base; a support rotatably mounted on said base for movement about a horizontal axis only; two identically constructed telescopes carried by said support on opposite sides of said base with their view openings parallel to each other and perpendicular to the axis of rotation of said support; said telescopes having oculars with their axes parallel to and near the axis of rotation of said support; reflecting means in front of said view openings and each mounted for rotation about an axis which is perpendicular both to the axes of said view openings and to the axis of rotation of said support and spaced from said latter axis in order to enable the turning of the sighting line of each telescope from the vertical to the horizontal in both directions; light deflectors carried by the support for directing light rays to the oculars; driving means connected to said support for equiangularly tilting both telescopes; driving means connected to impart equiangular tilting movement to both of said reflecting means; and means for determining the angle of tilt of said telescopes and of said reflecting means.

5. A theodolite comprising, in combination, a base; a support rotatably mounted on said base for movement about a single horizontal axis; two identically constructed telescopes mounted on said support on opposite sides of said base with their view openings parallel to each other and perpendicular to the axis of rotation of said support; said telescopes having oculars with their axes parallel to the axis of rotation of said support; reflecting means in front of said view openings and each mounted for rotation about an axis which is perpendicular both to the axes of said view openings and to the axis of rotation of said support and spaced from said latter axis in order to enable the turning of the sighting line of each telescope from the vertical to the horizontal in both directions; light deflectors carried by the support for directing light rays to the oculars; two handles mounted on the base on opposite sides of the oculars; a gear operable by one handle and connected to impart equiangular tilting movement to both telescopes; a system for the transmission of angular movements including a transmitter motor and two receiver motors connected together, the transmitter motor being mounted on the base and operable by the other handle and said receiver motors being mounted on the respective telescopes and connected to impart joint and equiangular tilting movement to both of said reflecting means; and means for determining the angle of tilt of said telescopes and of said reflecting means.

6. A theodolite comprising, in combination, a base; a support mounted on said base for movement about a single horizontal axis; two identically constructed telescopes mounted on said support symmetrical to said axis of rotation with their view openings perpendicular to said axis; said telescopes having oculars with their axes coaxially arranged with respect to said axis and mounted on opposite sides of said support; reflecting means in front of said view openings and mounted for coaxial rotation about an axis at right angles to the axes of said view openings and to the axis of rotation of said support and at a distance from said latter axis in order to enable the turning of the sighting line of each telescope from the vertical to the horizontal in both directions; light deflectors carried by the support for directing light rays to the oculars; first optical means for deflecting rays of light from the view openings towards the axis of rotation of said support; second optical means mounted on said axis of rotation of said support for deflecting the rays of light received from said first optical means coaxially with respect to the horizontal axis and in opposite directions to said oculars; driving means connected to said support for equiangularly tilting both telescopes; driving means connected to both reflecting means in front of said view openings for equiangularly tilting the same about their axes of rotation; and means for determining the angles of tilt of said telescopes and of said reflecting means about their axes of rotation.

7. A theodolite comprising, in combination, a base; a support mounted on said base for movement about a horizontal axis only; two identically constructed telescopes mounted on said support symmetrical to said axis of rotation with their view openings perpendicular to said axis; said telescopes having oculars with their axes coaxially mounted on said base and on opposite sides of said support and parallel to and spaced from said axis; reflecting means in front of said view openings and mounted for coaxial rotation about an axis at right angles to the axes of said view openings and to the axis of rotation of said support and at a distance from said latter axis in order to enable the turning of the sighting line of each telescope from the vertical to the horizontal in both directions; first optical means for deflecting rays of light from the view openings towards the axis of rotation of said support; second optical means mounted on said axis of rotation of said support for deflecting the rays of light received from said first optical means coaxially with respect to the horizontal axis and in opposite directions; third optical means mounted on said base for deflecting rays of light received from said second optical means to said oculars; driving means connected to said support for equiangularly tilting both telescopes; driving means connected to both of said reflecting means in front of said view openings for equiangularly tilting said reflecting means; and means for determining the angles of tilt of said telescopes and of said reflecting means about their axes of rotation.

8. A theodolite comprising, in combination, a base; a support rotatably mounted on said base about a single horizontal axis; a telescope carried by said support with its view opening perpendicular to the axis of rotation of said support; said telescope having an ocular with its axis parallel to the axis of rotation of said support; reflecting means in front of said view opening and mounted for rotation about an axis which is perpendicular both to the axis of said view opening and to the axis of rotation of said support and at a distance from said latter axis in order to enable the turning of the sighting line of the telescope from the vertical to the horizontal in both directions; a light deflector for directing the light rays to the ocular; means for separately tilting said telescope and said reflecting means; means for determining the angle of tilt about said two axes of rotation; and a reticle and an erecting prism in the path of light of the telescope, the erecting prism being arranged behind the reticle.

9. A theodolite comprising, in combination, a base; a support mounted on said base for movement exclusively about a horizontal axis; two identically constructed telescopes mounted on said support symmetrical to said axis of rotation with their view openings perpendicular to said axis, said telescopes having oculars with their axes coaxially mounted on said base and on opposite sides of said support and parallel to and spaced from said axis; reflecting means in front of said view openings and mounted for coaxial rotation about an axis at right angles to the axes of said view openings and to the axis of rotation of said support and at a distance from said latter axis in order to enable the turning of the sighting line of each telescope, from the vertical to the horizontal in both directions, the view openings of said telescope being arranged one behind the other in the direction of the axis of rotation of said reflecting means; first optical means for deflecting rays of light from the view openings towards the axis of rotation of said support; second optical means mounted on said axis of rotation of said support for deflecting the rays of light received from said first optical means coaxially with respect to the horizontal axis and in opposite directions; third optical means mounted on said base for deflecting rays of light received from said second optical means to said oculars; driving means connected to said support for equiangularly tilting both telescopes; driving means connected to both of said reflecting means in front of said view openings for equiangularly tilting said reflecting means; means for determining the angle of tilt of said telescopes and of said reflecting means about their axes of rotation; and a reticle and an erecting prism in the path of light of the telescopes, the erecting prism being arranged behind the reticle.

WILHELM SCHNITTGER.